(12) United States Patent
Jeong et al.

(10) Patent No.: US 10,797,352 B2
(45) Date of Patent: Oct. 6, 2020

(54) CURVED SECONDARY BATTERY HAVING THREE-DIMENSIONAL STRUCTURE AND METHOD OF MANUFACTURING THE SAME

(71) Applicant: SAMSUNG ELECTRONICS CO., LTD., Suwon-si, Gyeonggi-do (KR)

(72) Inventors: Huisu Jeong, Suwon-si (KR); Hwiyeol Park, Ansan-si (KR); Jin S. Heo, Hwaseong-si (KR); Kyounghwan Kim, Seoul (KR); Hojung Yang, Suwon-si (KR); Sungjin Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 259 days.

(21) Appl. No.: 15/699,023

(22) Filed: Sep. 8, 2017

(65) Prior Publication Data

US 2018/0090783 A1   Mar. 29, 2018

(30) Foreign Application Priority Data

Sep. 27, 2016 (KR) .................. 10-2016-0124246

(51) Int. Cl.
| | |
|---|---|
| *H01M 10/058* | (2010.01) |
| *H01M 10/0525* | (2010.01) |
| *H01M 10/0562* | (2010.01) |
| *H01M 4/525* | (2010.01) |
| *H01M 4/505* | (2010.01) |
| *H01M 4/131* | (2010.01) |
| *H01M 4/13* | (2010.01) |
| *H01M 4/139* | (2010.01) |
| *H01M 4/04* | (2006.01) |
| *H01M 4/02* | (2006.01) |

(52) U.S. Cl.
CPC .......... *H01M 10/058* (2013.01); *H01M 4/13* (2013.01); *H01M 4/131* (2013.01); *H01M 4/139* (2013.01); *H01M 4/505* (2013.01); *H01M 4/525* (2013.01); *H01M 10/0525* (2013.01); *H01M 10/0562* (2013.01); *H01M 4/0471* (2013.01); *H01M 2004/025* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 7,049,028 B2 | 5/2006 | Notten et al. | |
| 7,553,584 B2 | 6/2009 | Chiang et al. | |
| 9,166,230 B1 * | 10/2015 | Lahiri | H01M 10/4235 |

(Continued)

FOREIGN PATENT DOCUMENTS

| | | |
|---|---|---|
| KR | 1006206370000 A | 9/2006 |
| WO | 0182393 A2 | 11/2001 |

*Primary Examiner* — Jeremiah R Smith
(74) *Attorney, Agent, or Firm* — Cantor Colburn LLP

(57) ABSTRACT

A secondary battery having a three-dimensional ("3D") structure with a curvature and a method of manufacturing the same are provided. The secondary battery includes a 3D electrode structure, and a first collector layer and a second collector layer, which are disposed on the 3D electrode structure. The 3D electrode structure is curved in a thickness direction thereof to have a curvature, and the first collector layer and the second collector layer have a curvature corresponding to the curvature of the 3D electrode structure.

7 Claims, 17 Drawing Sheets

(56) References Cited

U.S. PATENT DOCUMENTS

| | | |
|---|---|---|
| 9,300,002 B2 | 3/2016 | Shaw |
| 2003/0039883 A1* | 2/2003 | Notten .................. H01M 4/043 |
| | | 429/176 |
| 2009/0197161 A1* | 8/2009 | Nakamura ............ H01M 2/206 |
| | | 429/158 |
| 2013/0230751 A1* | 9/2013 | Shaw ..................... H01G 11/12 |
| | | 429/72 |
| 2015/0140371 A1 | 5/2015 | Slocum |
| 2016/0141711 A1 | 5/2016 | Jung |

* cited by examiner

CURVED SECONDARY BATTERY HAVING THREE-DIMENSIONAL STRUCTURE AND METHOD OF MANUFACTURING THE SAME

CROSS-REFERENCE TO RELATED APPLICATION

This application claims priority to Korean Patent Application No. 10-2016-0124246, filed on Sep. 27, 2016, and all the benefits accruing therefrom under 35 U.S.C. § 119, the content of which in its entirety is herein incorporated by reference.

BACKGROUND

1. Field

Embodiments of the invention relate to secondary batteries, and more particularly, to curved secondary batteries having a three-dimensional ("3D") structure and methods of manufacturing the same.

2. Description of the Related Art

Unlike a non-rechargeable primary battery, a secondary battery is a rechargeable battery that is widely used in a field of advanced electronic devices such as a cellular phone, a notebook computer, and a camcorder, for example, but not limited thereto.

In particular, since a lithium secondary battery has a higher voltage and a higher energy density per unit weight than those of a nickel-cadmium battery and a nickel-hydride battery, which are widely used as a power supply of a portable electronic device, there is an increasing demand for the lithium secondary battery. A lithium-based oxide is mostly used as a positive active material of the lithium secondary battery, and a carbon material is mostly used as a negative active material thereof. Recently, a high capacity secondary battery, which uses an electrode having a 3D structure capable of realizing a high energy density, has been developed.

SUMMARY

Provided are curved secondary batteries having a three-dimensional ("3D") structure and methods of manufacturing the same.

Additional embodiments will be set forth in part in the description which follows and, in part, will be apparent from the description, or may be learned by practice of the presented embodiments.

According to an embodiment, a secondary battery includes a 3D electrode structure curved in a thickness direction of the 3D electrode structure to have a curvature, a first collector layer disposed on a first surface of the 3D electrode structure and having a curvature corresponding to the curvature of the 3D electrode structure, and a second collector layer disposed on a second surface of the 3D electrode structure and having a curvature corresponding to the curvature of the 3D electrode structure.

In an embodiment, the 3D electrode structure may include a first active material layer disposed on the first collector layer, a solid electrolyte film disposed on the first active material layer, and a second active material layer disposed on the solid electrolyte film.

In an embodiment, the first active material layer may include a bottom active material layer disposed on the first collector layer and curved to have the curvature, and a plurality of perpendicular active material layers disposed perpendicularly on the bottom active material layer. The plurality of perpendicular active material layers may be disposed in parallel to one another along a length direction of the 3D electrode structure.

In an embodiment, the first active material layer may include a plurality of perpendicular active material layers disposed perpendicularly on the first collector layer.

According to another embodiment, a secondary battery includes a plurality of unit cells stacked, where each of the plurality of unit cells includes a 3D electrode structure curved in a thickness direction of the 3D electrode structure to have a curvature, a first collector layer disposed on a first surface of the 3D electrode structure and having a curvature corresponding to the curvature of the 3D electrode structure, and a second collector layer disposed on a second surface of the 3D electrode structure and having a curvature corresponding to the curvature of the 3D electrode structure.

In an embodiment, the plurality of unit cells may be stacked such that a first collector layer of one unit cell and a second collector layer of an adjacent unit cell face each other. An insulating layer may be further disposed between the adjacent unit cells.

In an embodiment, the plurality of unit cells may be stacked such that first collector layers of adjacent unit cells face each other and second collector layers of the adjacent unit cells face each other.

In an embodiment, the 3D electrode structure may include a first active material layer disposed on the first collector layer, a solid electrolyte film disposed on the first active material layer, and a second active material layer disposed on the solid electrolyte film.

In an embodiment, the first active material layer may include a bottom active material layer disposed on the first collector layer and curved to have the curvature, and a plurality of perpendicular active material layers disposed perpendicularly on the bottom active material layer.

In an embodiment, the first active material layer may include a plurality of perpendicular active material layers disposed perpendicularly on the first collector layer.

According to another embodiment, a method of manufacturing a secondary battery includes forming a first active material layer curved to have a curvature through a sintering process, forming a 3D electrode structure by respectively forming a solid electrolyte film and a second active material layer on the first active material layer, and forming a first collector layer and a second collector layer on a first surface and a second surface of the 3D electrode structure.

In an embodiment, the first active material layer may include a bottom active material layer, and a plurality of perpendicular active material layers disposed perpendicular to the bottom active material layer. The forming of the first active material layer may include forming a stacked structure in which a plurality of perpendicular active material films and a plurality of sacrifice films are alternately stacked, attaching the stacked structure to a bottom active material film, and forming the first active material layer by performing the sintering process on the bottom active material film and the stacked structure.

In an embodiment, the first active material layer may be provided to have the curvature due to a contraction percentage difference between the bottom active material film and the plurality of perpendicular active material films.

According to another embodiment, a method of manufacturing a secondary battery includes forming a first collector layer and a first active material layer, which are curved to have a curvature through a sintering process, forming a 3D electrode structure by forming a solid electrolyte film and a second active material layer on the first active material layer, and forming a second collector layer on the 3D electrode structure.

In an embodiment, the first active material layer may include a plurality of perpendicular active material layers disposed perpendicularly on the first collector layer.

In an embodiment, the forming of the first collector layer and the first active material layer may include forming a stacked structure in which a plurality of perpendicular active material films and a plurality of sacrifice films are alternately stacked, attaching the stacked structure to a first collector film, and forming the first collector layer and the first active material layer by performing the sintering process on the first collector film and the stacked structure.

The first collector layer and the first active material layer may be provided to have the curvature through the sintering process due to a contraction percentage difference between the first collector film and the plurality of perpendicular active material films.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
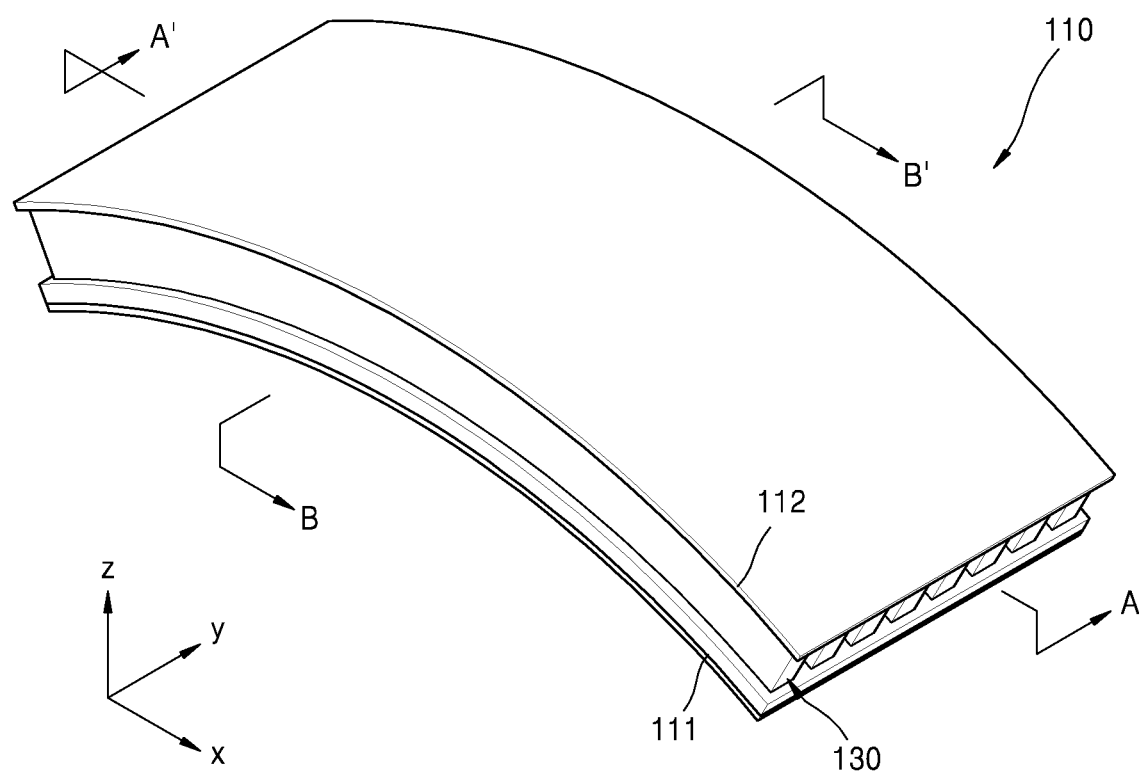
FIG. 1 is a perspective view of an embodiment of a unit cell in a secondary battery.

Hereinafter, embodiments are described in detail with reference to the accompanying drawings. In the drawings, like reference numerals denote like elements, sizes or thicknesses of components in the drawings may be exaggerated for clarity convenience of explanation. It will be understood that when a certain material layer is referred to as being "on" a substrate or another layer, it may be directly formed on the substrate or the other layer, or an intervening layer may be present. In the following embodiments, a material constituting each layer is merely an example, other materials may be used.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
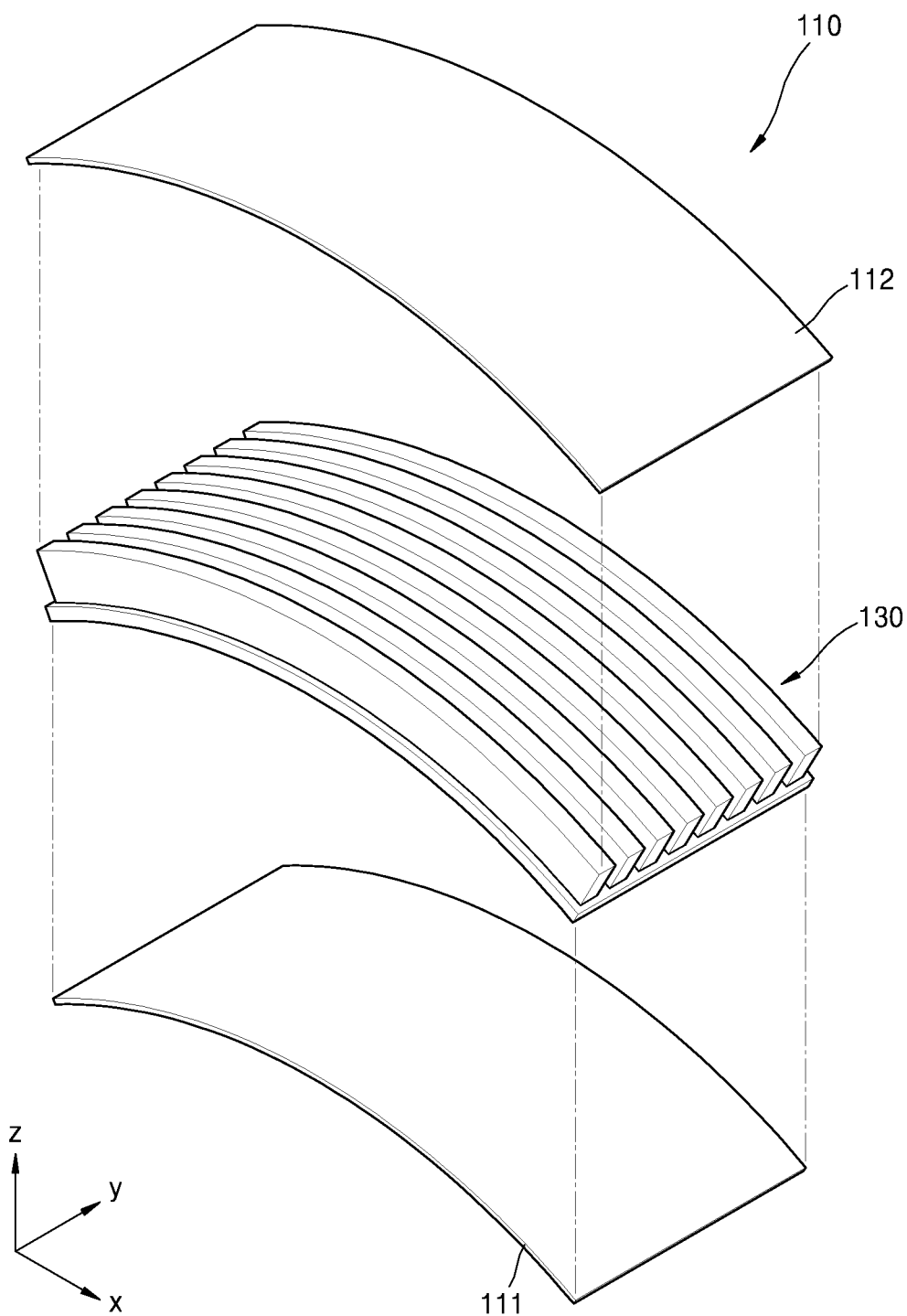
FIG. 2 is an exploded perspective view of the unit cell illustrated in FIG. 1.
Figure 3A:
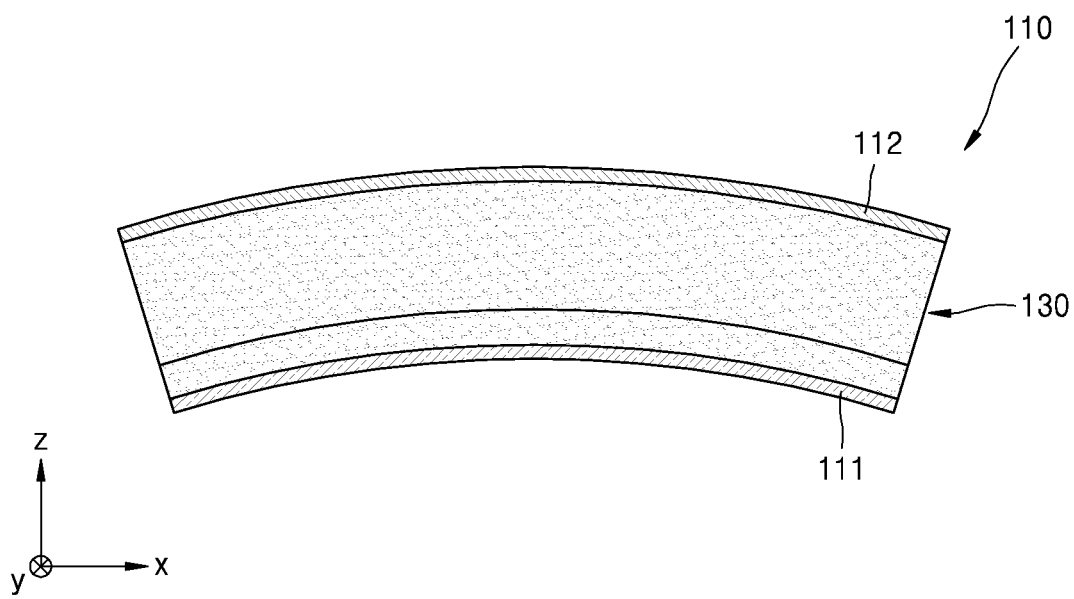
FIG. 3A is a cross-sectional view taken along line A-A' of FIG. 1.
Figure 3B:
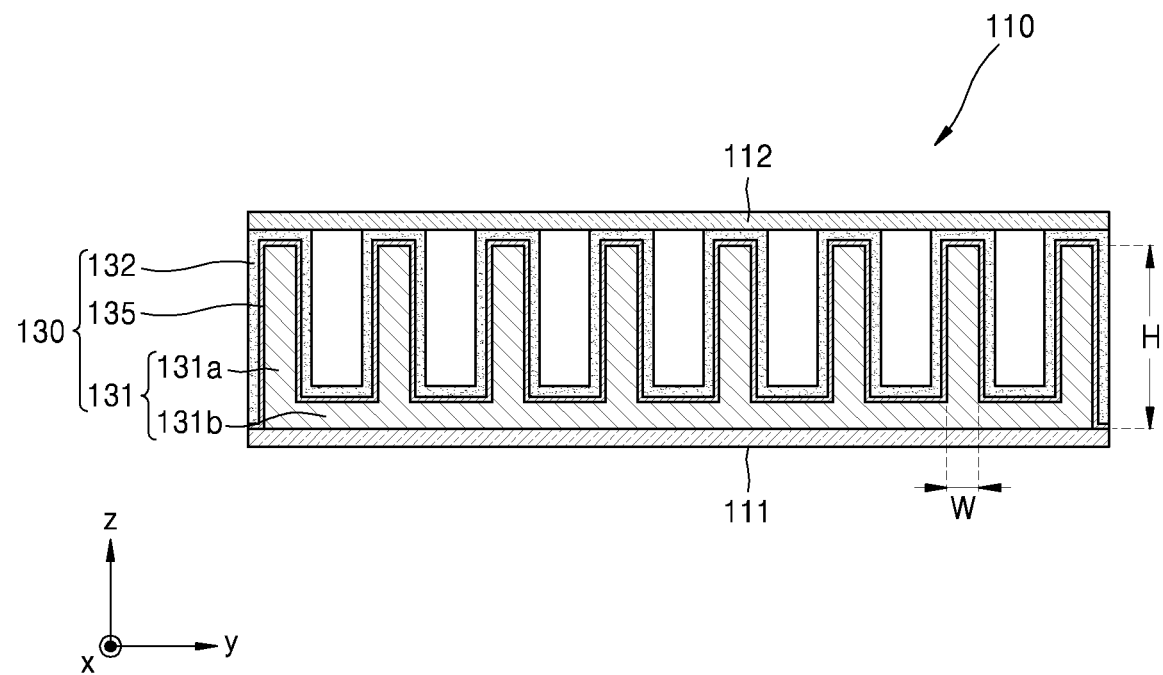
FIG. 3B is a cross-sectional view taken along line B-B' of FIG. 1.

FIG. 1 is a perspective view of a unit cell 110 in a secondary battery, according to an embodiment, and FIG. 2 is an exploded perspective view of the unit cell 110 illustrated in FIG. 1. FIG. 3A is a cross-sectional view taken along line A-A' of FIG. 1, and FIG. 3B is a cross-sectional view taken along line B-B' of FIG. 1.

Referring to FIGS. 1 to 3B, the unit cell 110 of the secondary battery may include a first collector layer 111 and a second collector layer 112, which are spaced apart from each other, and a three-dimensional ("3D") electrode structure 130 disposed between the first collector layer 111 and the second collector layer 112. The first collector layer 111 and the second collector layer 112 may be disposed on a lower surface and an upper surface of the 3D electrode structure 130, respectively. The 3D electrode structure 130 may be curved to have a curvature, and thus, the first collector layer 111 and the second collector layer 112 may also be curved to have a curvature corresponding to the curvature of the 3D electrode structure 130.

In an embodiment, the first collector layer 111 and the second collector layer 112 may be, for example, a cathode collector layer and an anode collector layer, respectively. In an embodiment, the first collector layer 111 and the second collector layer 112 may include, for example, metals such as aluminum (Al), nickel (Ni), and copper (Cu), but embodiments of the invention are not limited thereto.

The 3D electrode structure 130 may include a first active material layer 131 disposed on the first collector layer 111, a solid electrolyte film 135 disposed on the first active material layer 131, and a second active material layer 132 disposed on the solid electrolyte film 135. In an embodiment, the first active material layer 131 may be, for example, a positive active material layer. In an embodiment, the first active material layer 131 may include $LiMO_2$ (where M is any one of cobalt (Co), nickel (Ni), and manganese (Mn) or is a combination of two or more thereof), for example. However, the first active material layer 131 is not limited thereto.

The first active material layer 131 may include a bottom active material layer 131b disposed on the first collector layer 111 and a plurality of perpendicular active material layers 131a disposed perpendicularly on the bottom active material layer 131b. Each of the perpendicular active material layers 131a may include a 3D structure having a high aspect ratio. The aspect ratio denotes a ratio of a height H, taken along a z-axis direction, to a width W, taken along a y-axis direction, of the 3D structure (that is height: width=height/width). In an embodiment, each of the perpendicular active material layers 131a may have, for example, an aspect ratio equal to or greater than about 1:1. However, the aspect ratio equal to or greater than about 1:1 is a mere example. The perpendicular active material layers 131a may be disposed on the bottom active material layer 131b in parallel to one another and be arranged along a length direction of the unit cell 110 in the secondary battery, i.e., an x-axis direction. The first active material layer 131 may be formed through a sintering process described below. In an embodiment, the first active material layer 131 formed through the sintering process may have a sintered density equal to or greater than about 80%, for example. The sintered density of the first active material layer 131 means a ratio of a volume of an active material to a total volume of the first active material layer 131 formed through the sintering process.

The solid electrolyte film 135 may cover a surface of the first active material layer 131. In an embodiment, the solid electrolyte film 135 may include, for example, a lithium (Li)-based material. Specifically, in the embodiment, the solid electrolyte film 135 may include lithium phosphorus oxynitride (LiPON), lithium silicophosphate (LiSiPON), lithium lanthanum zirconium oxide ("LLZO"), or lithium aluminum titanium phosphate ("LATP"), for example, but the solid electrolyte film 135 is not limited thereto. The second active material layer 132 may cover a surface of the solid electrolyte film 135. In an embodiment, the second active material layer 132 may be, for example, a negative active material layer. In an embodiment, the second active material layer 132 may be, for example, Li or the like, but the second active material layer 132 is not limited thereto. The second active material layer 132 is illustrated in FIG. 3B as being disposed on the solid electrolyte film 135 such that an empty space is defined between the perpendicular active material layers 131a, but the second active material layer 132 is not limited thereto. The second active material layer 132 may be disposed on the solid electrolyte film 135 to fill up the space between the perpendicular active material layers 131a.

The 3D electrode structure 130 including the first active material layer 131, the solid electrolyte film 135, and the second active material layer 132 may have a shape curved to have a curvature. FIG. 3A illustrates a cross section of the unit cell 110 in the secondary battery along the length direction of the unit cell 110, i.e., the x-axis direction, and FIG. 3B illustrates a cross section of the unit cell 110 in the secondary battery along a width direction of the unit cell 110, i.e., a y-axis direction.

As illustrated in FIG. 3A, the 3D electrode structure 130 may have a shape curved along the length direction thereof, i.e., the x-axis direction. The 3D electrode structure 130 may have a shape deformed and curved in a thickness direction thereof, i.e., a z-axis direction, with a certain curvature. A size of the curvature in the 3D electrode structure 130 may vary according to a design condition. The 3D electrode structure 130 is illustrated in FIG. 3A as being convexly curved in an upward direction, i.e., a +z-axis direction. The 3D electrode structure 130 may have a shape convexly curved toward the second collector layer 112. The 3D electrode structure 130 may have a shape scarcely curved along the width direction thereof, i.e., the y-axis direction as illustrated in FIG. 3B. The curved shape of the 3D electrode structure 130 may be defined by a contraction percentage difference between the material forming the bottom active material layer 131b and the material forming the perpendicular active material layers 131a, specifically, a line contraction percentage difference according to the length direction of the 3D electrode structure 130. Since the first collector layer 111 and the second collector layer 112 are respectively disposed on the lower surface and the upper surface of the 3D electrode structure 130, the first collector layer 111 and the second collector layer 112 may each have a curvature corresponding to the curvature of the 3D electrode structure 130.

According to the illustrated embodiment, the unit cell 110 of the secondary battery may have a curved shape with a curvature, and a plurality of curved unit cells 110 may be stacked to realize a secondary battery having a high density and high capacity.

Generally, a secondary battery including unit cells having a two-dimensional ("2D") structure may realize a high density and high capacity by bending the unit cells. However, such a secondary battery may have a lower capacity per a volume than that of a secondary battery having a 3D structure. In addition, an active material may be damaged when the secondary battery having the 3D structure is bent through a subsequent process so as to realize a high density and high capacity. Therefore, according to the illustrated embodiment, the unit cells 110 may be manufactured in a previously curved shape and be stacked, thereby realizing a secondary battery having a high density and high capacity. The secondary battery having the curved shape may be especially usefully applicable in a mobile device such as a smartphone or a wearable mobile device such as a smartwatch, which requires high capacity.

In the above description, the first collector layer 111 and the second collector layer 112 are respectively the cathode collector layer and the anode collector layer, and the first active material layer 131 and the second active material layer 132 are respectively the positive active material layer and the negative active material layer. However, the first collector layer 111, the second collector layer 112, the first active material layer 131 and the second active material layer 132 are not limited thereto, and it is possible that the first collector layer 111 and the second collector layer 112 are respectively the negative collector layer and the cathode collector layer, and the first active material layer 131 and the second active material layer 132 are respectively the negative active material layer and the positive active material layer.

Figure 4:
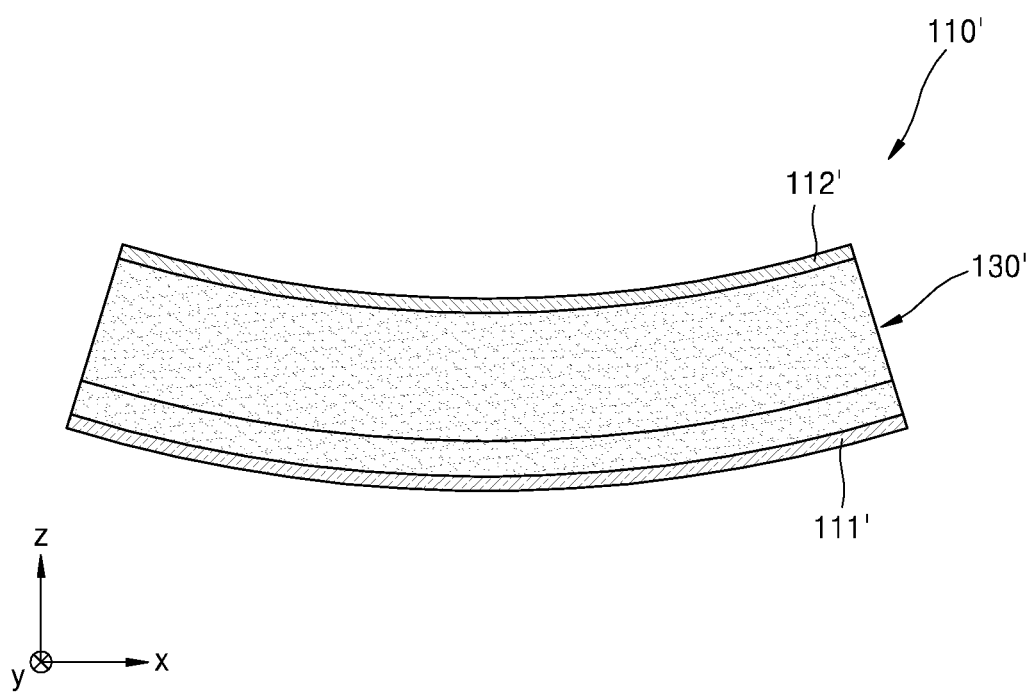
FIG. 4 is a cross-sectional view of another embodiment of a unit cell in a secondary battery.

FIG. 4 is a cross-sectional view of a unit cell 110' in a secondary battery, according to another embodiment. A cross section of the unit cell 110' in the secondary battery is illustrated in a length direction of the unit cell 110' in FIG. 4.

Referring to FIG. 4, the unit cell 110' of the secondary battery may include a first collector layer 111' and a second collector layer 112', which are spaced apart from each other, and a 3D electrode structure 130' disposed between the first collector layer 111' and the second collector layer 112'. The 3D electrode structure 130' may be curved to have a curvature, and the first collector layer 111' and the second collector layer 112' may also be curved to have a curvature corresponding to the curvature of the 3D electrode structure 130'. The 3D electrode structure 130' may have a shape convexly curved in a downward direction, i.e., a −z-axis direction to have a curvature. In this case, the 3D electrode structure 130' may have a shape convexly curved toward the first collector layer 111'.

Figure 5A:
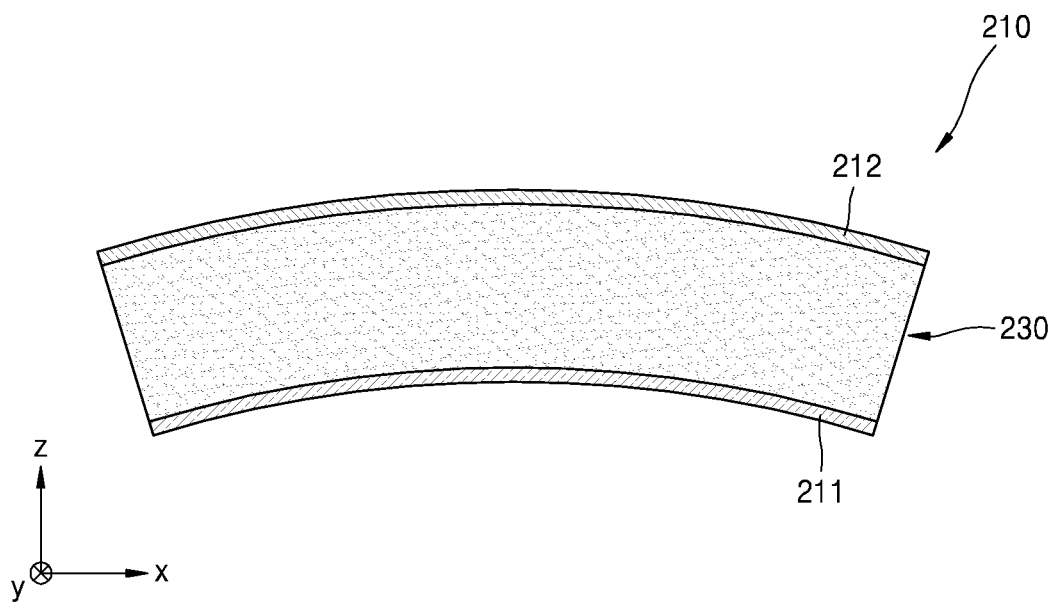
FIGS. 5A and 5B are cross-sectional views of another embodiment of a unit cell in a secondary battery.
Figure 5B:
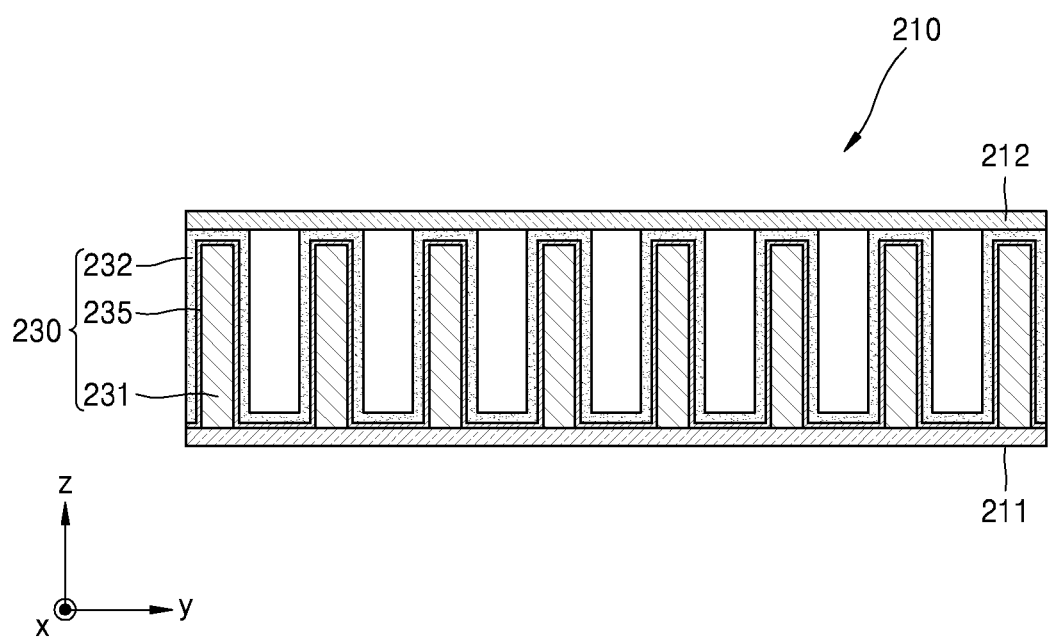

FIGS. 5A and 5B are cross-sectional views of a unit cell 210 in a secondary battery, according to another embodiment. A cross section of the unit cell 210 in the secondary battery is illustrated along a length direction of the unit cell 210 in FIG. 5A, and a cross section of the unit cell 210 in the secondary battery is illustrated along a width direction of the unit cell 210 in FIG. 5B.

Referring to FIGS. 5A and 5B, the unit cell 210 of the secondary battery may include a first collector layer 211 and a second collector layer 212, which are spaced apart from each other, and a 3D electrode structure 230 disposed between the first collector layer 211 and the second collector layer 212. The 3D electrode structure 230 may be curved to have a curvature, and the first collector layer 211 and the second collector layer 212 may also be curved to have a curvature corresponding to the curvature of the 3D electrode structure 230.

In an embodiment, the first collector layer 211 may be, for example, a cathode collector layer. The 3D electrode structure 230 is disposed on the first collector layer 211. The 3D electrode structure 230 may include a first active material layer 231 disposed on the first collector layer 211, a solid electrolyte film 235 disposed on the first active material layer 231, and a second active material layer 232 disposed on the solid electrolyte film 235. In an embodiment, the first active material layer 231 may be, for example, a positive active material layer.

The first active material layer 231 may include a plurality of perpendicular active material layers disposed perpendicularly on the first collector layer 211. Each of the perpendicular active material layers may include a 3D structure having a high aspect ratio. The perpendicular active material layers may be disposed on the first collector layer 211 in parallel to one another along a length direction of the unit cell 210.

The first collector layer 211 and the first active material layer 231 may be provided through a sintering process described below. The first collector layer 211 and the first active material layer 231 provided through the sintering process may each have a sintered density equal to or greater than about 80%, for example.

The solid electrolyte film 235 may cover a surface of the first active material layer 231. In an embodiment, the solid electrolyte film 235 may include, for example, a Li-based insulating material. The second active material layer 232 may cover a surface of the solid electrolyte film 235. In an embodiment, the second active material layer 232 may be, for example, a negative active material layer.

The 3D electrode structure 230 including the first active material layer 231, the solid electrolyte film 235, and the second active material layer 232 may have a shape curved to have a curvature. As illustrated in FIG. 5A, the 3D electrode structure 230 may have a shape curved along a length direction thereof, i.e., an x-axis direction. The 3D electrode structure 230 may have a shape deformed and curved in a thickness direction thereof, i.e., a z-axis direction to have a certain curvature. The 3D electrode structure 230 is illustrated in FIG. 5A as being convexly curved in an upward direction, i.e., a +z-axis direction. The 3D electrode structure 230 may have a shape convexly curved toward the second collector layer 212. In an alternative embodiment, the 3D electrode structure 230 may have a shape curved in a downward direction, i.e., a −z-axis direction. In this case, the 3D electrode structure 230' may have a shape convexly curved toward the first collector layer 211. The 3D electrode structure 230 may have a shape scarcely curved along a width direction thereof, i.e., a y-axis direction as illustrated in FIG. 5B.

Since the first collector layer 211 is disposed on a lower surface of the curved 3D electrode structure 230, the first collector layer 211 may have a curvature corresponding to the curvature of the 3D electrode structure 230. As described below, the first collector layer 211 and the 3D electrode structure 230 may be provided due to a contraction percentage difference between a material forming the first collector layer 211 and a material forming the first active material layer 231.

Since the second collector layer 212 is disposed on an upper surface of the curved 3D electrode structure, the second collector layer 212 may also have a curvature corresponding to the curvature of the 3D electrode structure 230. In an embodiment, the second collector layer 212 may be, for example, an anode collector layer.

According to the illustrated embodiment, the unit cell 210 of the secondary battery may have a curved shape with a curvature, and a plurality of curved unit cells 210 may be stacked to realize a secondary battery having a high density and high capacity. The secondary battery having the curved shape may be usefully applicable in a mobile device such as a smartphone or a wearable mobile device such as a smartwatch, which needs high capacity.

The case where the first collector layer 211 and the second collector layer 212 are respectively the cathode collector layer and the anode collector layer, and the first active material layer 231 and the second active material layer 232 are respectively the positive active material layer and the negative active material layer has been described. However, the first collector layer 211, the second collector layer 212, the first active material layer 231 and the second active material layer 232 are not limited thereto, and it is fully possible that the first collector layer 211 and the second collector layer 212 are respectively the negative collector layer and the cathode collector layer, and the first active material layer 231 and the second active material layer 232 are respectively the negative active material layer and the positive active material layer.

Figure 6A:
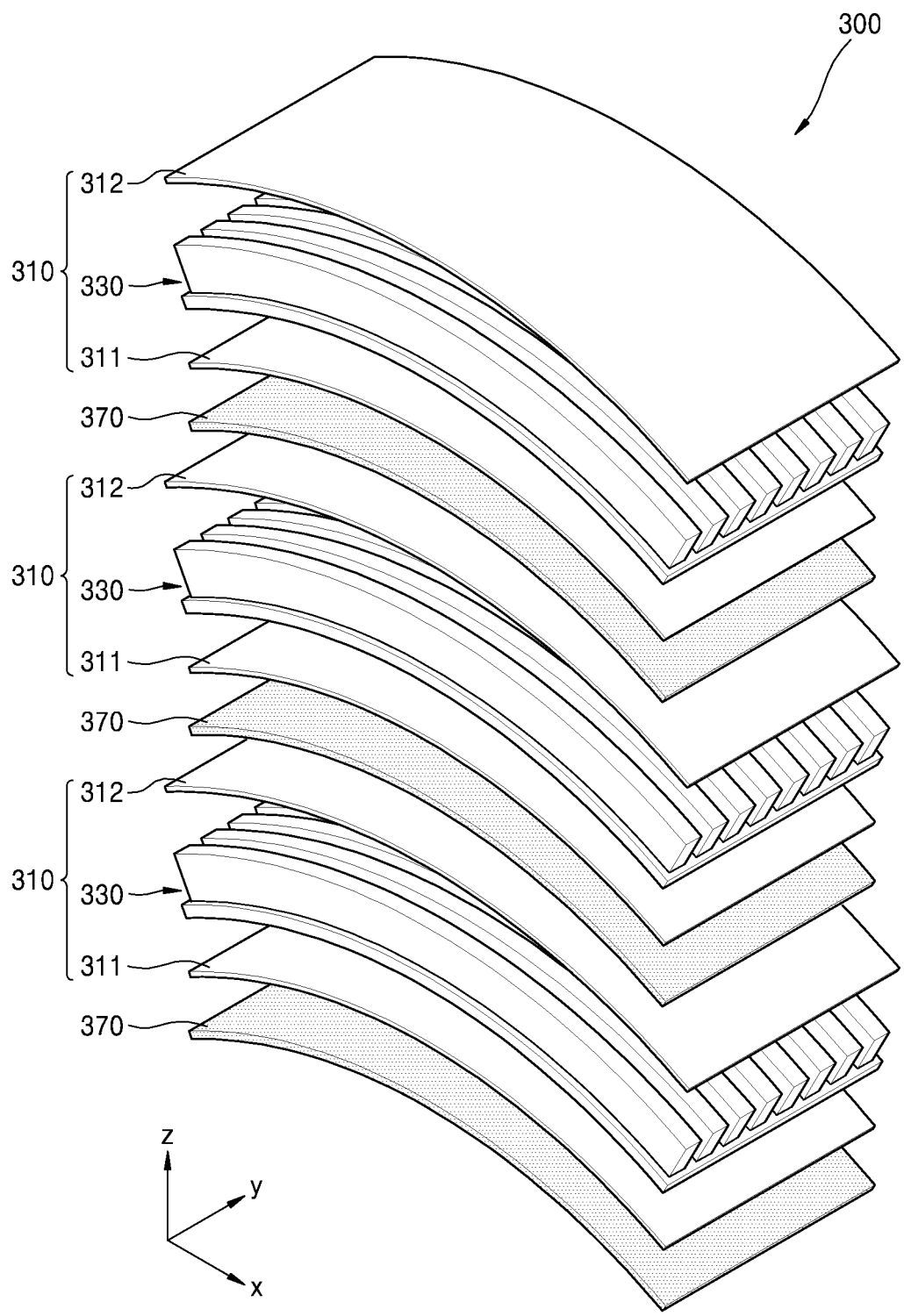
FIG. 6A is an exploded perspective view of another embodiment of a secondary battery.
Figure 6B:
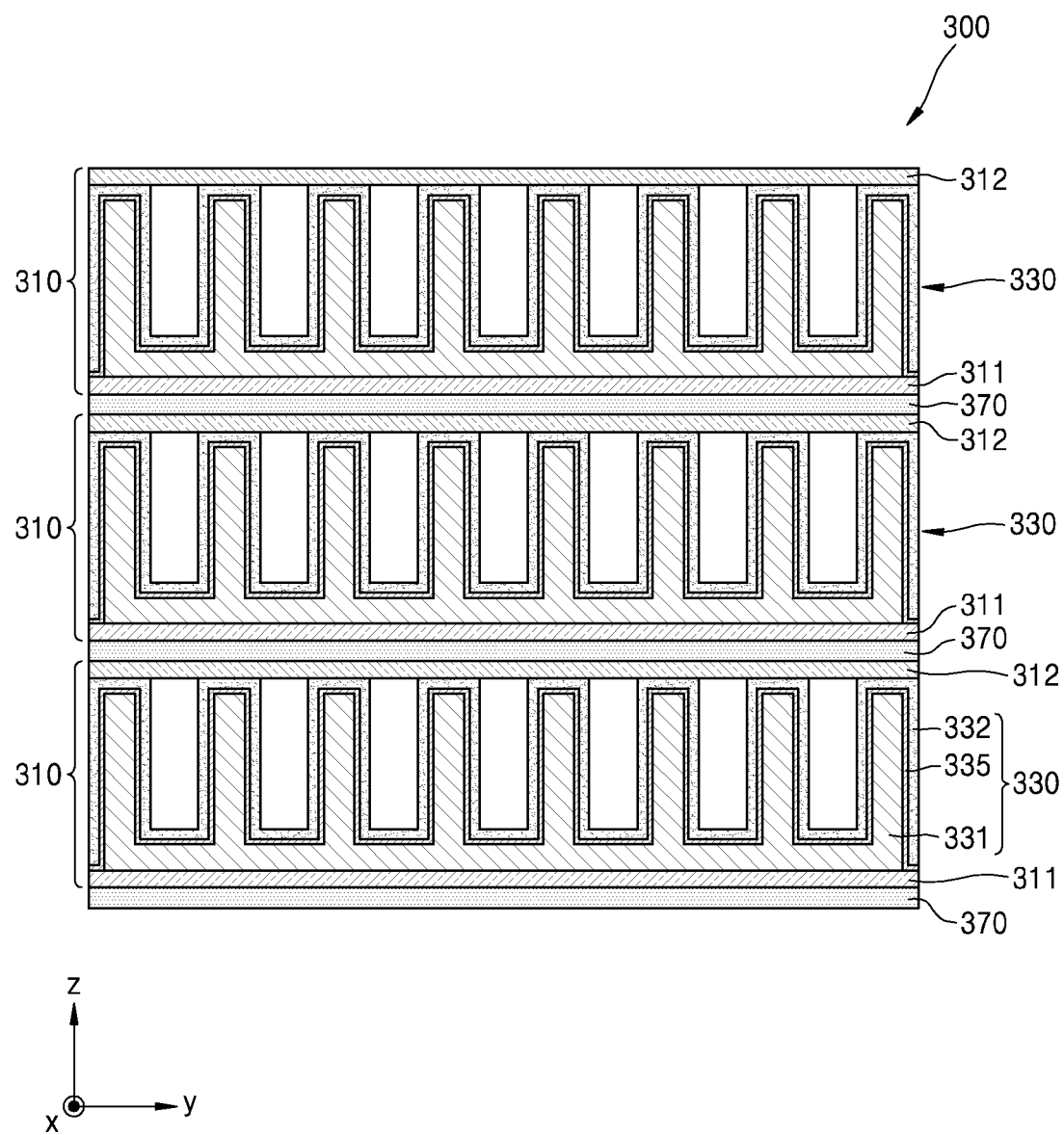
FIG. 6B is a cross-sectional view of the secondary battery illustrated in FIG. 6A.

FIG. 6A is an exploded perspective view of a secondary battery 300 according to an embodiment. FIG. 6B is a cross-sectional view of the secondary battery 300 illustrated in FIG. 6A. A cross section of the secondary battery 300 of FIG. 6A is illustrated along a width direction of the secondary battery 300 in FIG. 6B.

Referring to FIGS. 6A and 6B, the secondary battery 300 may include a plurality of unit cells 310 stacked in a perpendicular direction thereof, i.e., a z-axis direction. Each of the unit cells 310 may include a first collector layer 311, a 3D electrode structure 330 disposed on the first collector layer 311, and a second collector layer 312 disposed on the 3D electrode structure 330. The 3D electrode structure 330 may be curved to have a curvature as described above, and the first collector layer 311 and the second collector layer 312 may also be curved to have a curvature corresponding to the curvature of the 3D electrode structure 330.

In an embodiment, the first collector layer 311 and the second collector layer 312 may be, for example, a cathode collector layer and an anode collector layer, respectively. The 3D electrode structure 330 may include a first active material layer 331 disposed on the first collector layer 311, a solid electrolyte film 335 disposed on the first active material layer 331, and a second active material layer 332 disposed on the solid electrolyte film 335. In an embodiment, the first active material layer 331 may be, for example, a positive active material layer. In an embodiment, the first active material layer 331 may include $LiMO_2$ (where M is any one of Co, Ni, and Mn or is a combination of two or more thereof). However, the first active material layer 331 is not limited thereto.

The first active material layer 331 may include a bottom active material layer and a plurality of perpendicular active material layers disposed perpendicularly on the bottom active material layer. Each of the perpendicular active material layers may include a 3D structure having a high aspect ratio. In an alternative embodiment, the first active material layer 331 may include a plurality of perpendicular active material layers disposed perpendicularly on the first collector layer 311.

The solid electrolyte film 335 may cover a surface of the first active material layer 331. In an embodiment, the solid electrolyte film 335 may include, for example, a Li-based material such as LiPON, LiSiPON, LLZO, or LATP. The second active material layer 332 may cover a surface of the solid electrolyte film 335. In an embodiment, the second active material layer 332 may be, for example, a negative active material layer. In an embodiment, the second active material layer 332 may include, for example, Li or the like, but the second active material layer 332 is not limited thereto.

The 3D electrode structure 330 including the first active material layer 331, the solid electrolyte film 335, and the second active material layer 332 may have a shape curved to have a curvature. The 3D electrode structure 330 may have a shape curved along a length direction thereof, i.e., an x-axis direction. The 3D electrode structure 330 may have a shape deformed in a thickness direction thereof, i.e., a z-axis direction to have a certain curvature. The 3D electrode structure 330 is illustrated in FIG. 6A as being convexly curved in an upward direction, i.e., a +z-axis direction. The 3D electrode structure 330 may have a shape convexly curved toward the second collector layer 312. In an alternative embodiment, the 3D electrode structure 330 may have a shape convexly curved in a downward direction, i.e., a −z-axis direction. In this case, the 3D electrode structure 330 may have a shape convexly curved toward the first collector layer 311. The 3D electrode structure 330 may have a shape scarcely curved along a width direction thereof, i.e., a y-axis direction as illustrated in FIG. 6B. Since the first collector layer 311 and the second collector layer 312 are respectively disposed on a lower surface and an upper surface of the curved 3D electrode structure 330, the first collector layer 311 and the second collector layer 312 may each have a curvature corresponding to the curvature of the 3D electrode structure 330.

The unit cells 310 having the curved shape described above may be stacked to manufacture the secondary battery 300. Adjacent unit cells 310 may be stacked such that the first collector layer 311 and the second collector layer 312 having different polarities face each other. Specifically, the first collector layer 311 and the second collector layer 312 may face each other in the adjacent unit cells 310. In addition, an insulating layer 370 may be disposed between the adjacent unit cells 310 to prevent a short circuit between the first collector layer 311 and the second collector layer 312. As described above, the curved unit cells 310 having the curvature may be stacked to manufacture the secondary battery 300 having a high density and high capacity.

The case where the first collector layer 311 and the second collector layer 312 are respectively the cathode collector layer and the anode collector layer, and the first active material layer 331 and the second active material layer 332 are respectively the positive active material layer and the negative active material layer has been described. However, the first collector layer 311, the second collector layer 312, the first active material layer 331 and the second active material layer 332 are not limited thereto, and it is fully possible that the first collector layer 311 and the second collector layer 312 are respectively the negative collector layer and the cathode collector layer, and the first active material layer 331 and the second active material layer 332 are respectively the negative active material layer and the positive active material layer.

Figure 7A:
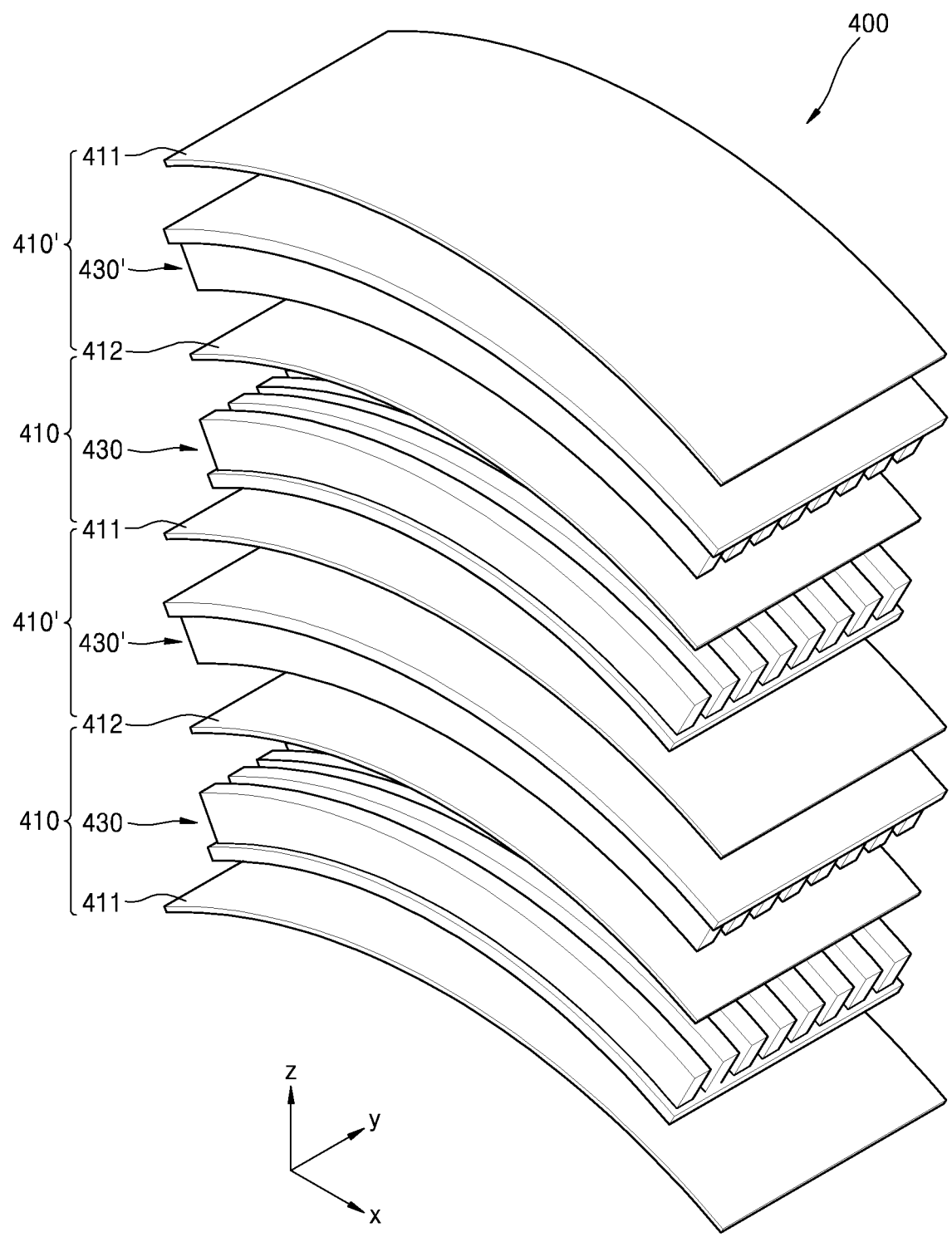
FIG. 7A is an exploded perspective view of another embodiment of a secondary battery.
Figure 7B:
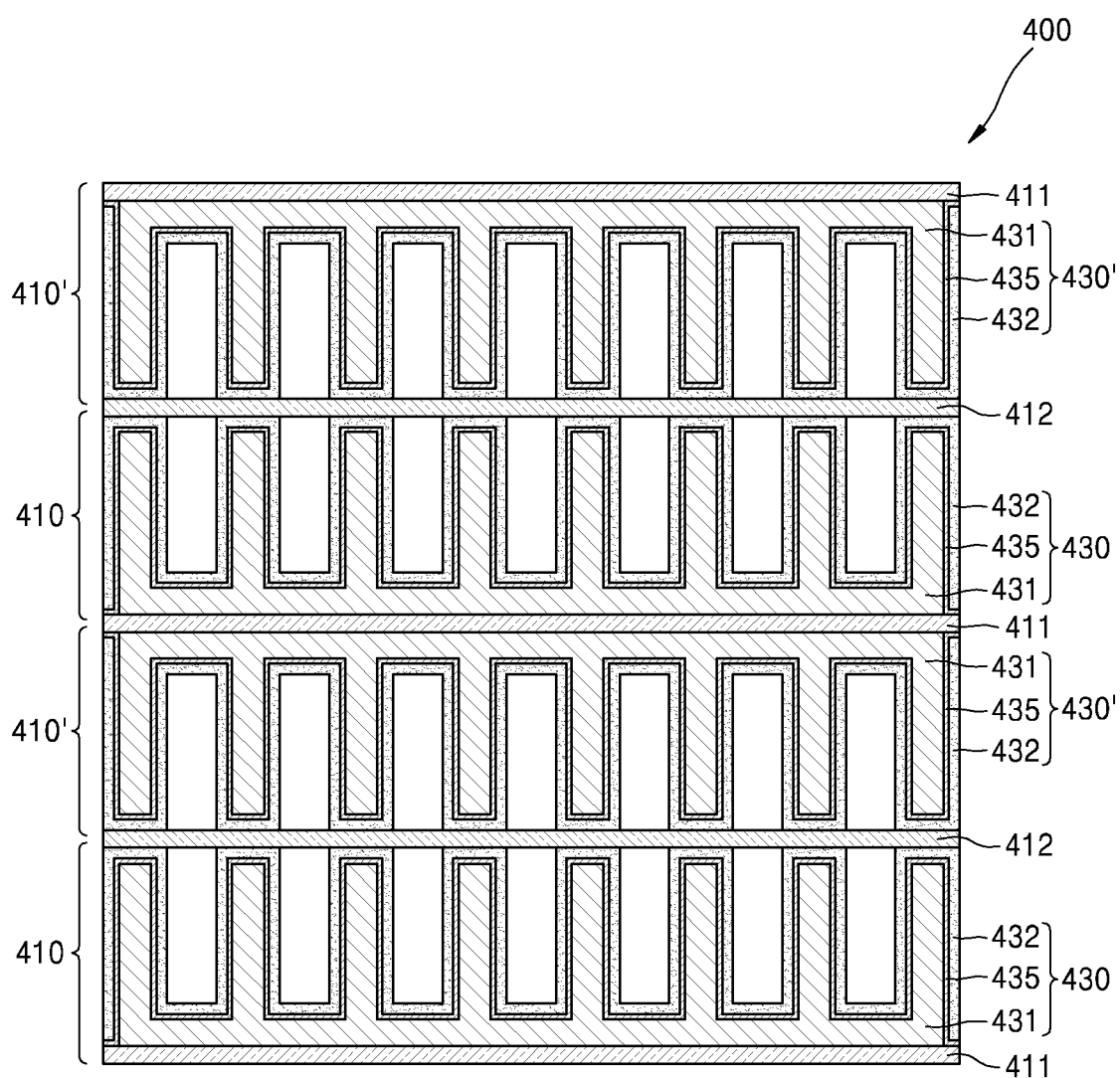
FIG. 7B is a cross-sectional view of the secondary battery illustrated in FIG. 7A.

FIG. 7A is an exploded perspective view of a secondary battery 400 according to another embodiment. FIG. 7B is a cross-sectional view of the secondary battery 400 illustrated in FIG. 7A. A cross section of the secondary battery 400 of FIG. 7A is illustrated along a width direction of the secondary battery 400 in FIG. 7B.

Referring to FIGS. 7A and 7B, the secondary battery 400 may include at least one first unit cell 410 and at least one second unit cell 410', which are alternately stacked in a perpendicular direction of the secondary battery 400, i.e., a z-axis direction. The first unit cell 410 may include a first collector layer 411, a 3D electrode structure 430 disposed on the first collector layer 411, and a second collector layer 412 disposed on the 3D electrode structure 430. The 3D electrode structure 430 may be curved to have a curvature, and the first collector layer 411 and the second collector layer 412 may also be curved to have a curvature corresponding to the curvature of the 3D electrode structure 430.

In an embodiment, the first collector layer 411 and the second collector layer 412 may be, for example, a cathode collector layer and an anode collector layer, respectively. The 3D electrode structure 430 may include a first active material layer 431 disposed on the first collector layer 411, a solid electrolyte film 435 disposed on the first active material layer 431, and a second active material layer 432 disposed on the solid electrolyte film 435. The first active material layer 431 may include a bottom active material layer and a plurality of perpendicular active material layers disposed perpendicularly on the bottom active material layer. In an alternative embodiment, the first active material layer 431 may include a plurality of perpendicular active material layers disposed perpendicularly on the first collector layer 411. The solid electrolyte film 435 may cover a surface of the first active material layer 431, and the second active material layer 432 may cover a surface of the solid electrolyte film 435.

The 3D electrode structure 430 of the first unit cell 410 may have a shape curved to have a curvature. The 3D electrode structure 430 of the first unit cell 410 may have a shape curved along a length direction thereof, i.e., an x-axis direction. Specifically, the 3D electrode structure 430 of the first unit cell 410 may have a shape convexly curved in an upward direction, i.e., a +z-axis direction. The 3D electrode structure 430 of the first unit cell 410 may have a shape convexly curved toward the second collector layer 412.

The second unit cell 410' stacked adjacent to the first unit cell 410 may include a first collector layer 411, a 3D electrode structure 430' disposed below the first collector layer 411, and a second collector layer 412 disposed below the 3D electrode structure 430'. The 3D electrode structure 430' of the second unit cell 410' may be curved to have a curvature, and the first collector layer 411 and the second collector layer 412 may also be curved to have a curvature corresponding to the curvature of the 3D electrode structure 430'.

The 3D electrode structure 430' of the second unit cell 410' may have a shape curved to have a curvature. The 3D electrode structure 430' of the second unit cell 410' may have a shape curved along a length direction thereof, i.e., the x-axis direction. Specifically, the 3D electrode structure 430' of the second unit cell 410' may have a shape convexly curved in the upward direction, i.e., the +z-axis direction. The 3D electrode structure 430' of the second unit cell 410' may have a shape convexly curved toward the first collector layer 411.

In the illustrated embodiment, the first unit cell 410 and the second unit cell 410' adjacent to each other may be alternately stacked while each having a shape convexly curved in the +z-axis direction. The 3D electrode structure 430 of the first unit cell 410 may be convexly curved toward the second collector layer 412, and the 3D electrode structure 430' of the first unit cell 410' may be convexly curved toward the first collector layer 411. The first unit cell 410 and the second unit cell 410' adjacent to each other may share one collector layer (411 or 412). Therefore, only one first collector layer 411 or only one second collector layer 412 may be disposed between the 3D electrode structure 430 of the first unit cell 410 and the 3D electrode structure 430' of the second unit cell 410'. As described above, the curved first and second unit cells 410 and 410' having the curvature may be stacked to manufacture a secondary battery having a high density and high capacity.

The case where the first collector layer 411 and the second collector layer 412 are respectively the cathode collector layer and the anode collector layer, and the first active material layer 431 and the second active material layer 432 are respectively the positive active material layer and the negative active material layer has been described. However, the first collector layer 411, the second collector layer 412, the first active material layer 431 and the second active material layer 432 are not limited thereto, and it is fully possible that the first collector layer 411 and the second collector layer 412 are respectively the negative collector layer and the cathode collector layer, and the first active material layer 431 and the second active material layer 432 are respectively the negative active material layer and the positive active material layer.

FIGS. 8 to 14 are diagrams for describing a method of manufacturing a unit cell 510 in a secondary battery, according to an embodiment.

Figure 8:
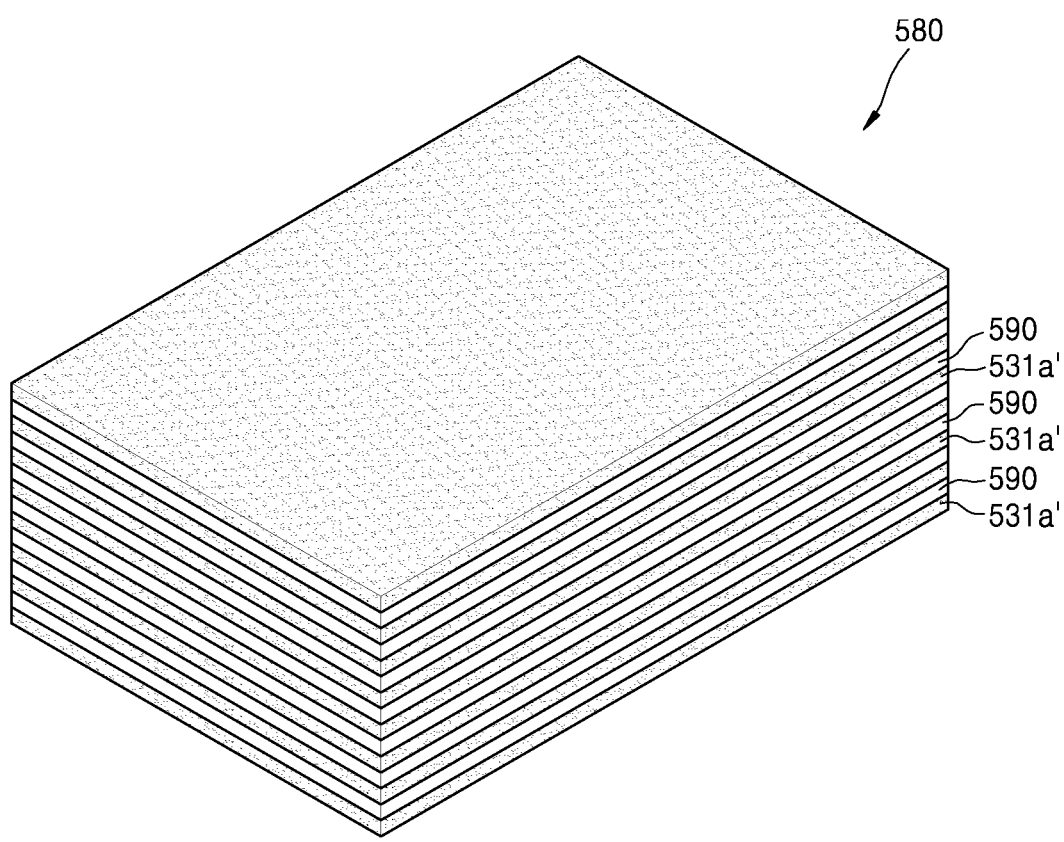
FIGS. 8 to 14 are diagrams for describing an embodiment of a method of manufacturing a unit cell in a secondary battery.

Referring to FIG. 8, a film stacking complex 580 may be prepared. The film stacking complex 580 may be prepared by alternately stacking a plurality of perpendicular active material films 531a' and a plurality of sacrifice films 590. The perpendicular active material films 531a' may include an active material powder and a polymer binder. In an embodiment, the active material powder may be, for example, a positive active material powder. The sacrifice films 590 may include a graphite powder and a polymer binder. In an embodiment, a volume fraction of the polymer binder may be in a range of about 20% to about 50% in the film stacking complex 580, for example, but the volume fraction of the polymer binder is not limited thereto.

Figure 9:
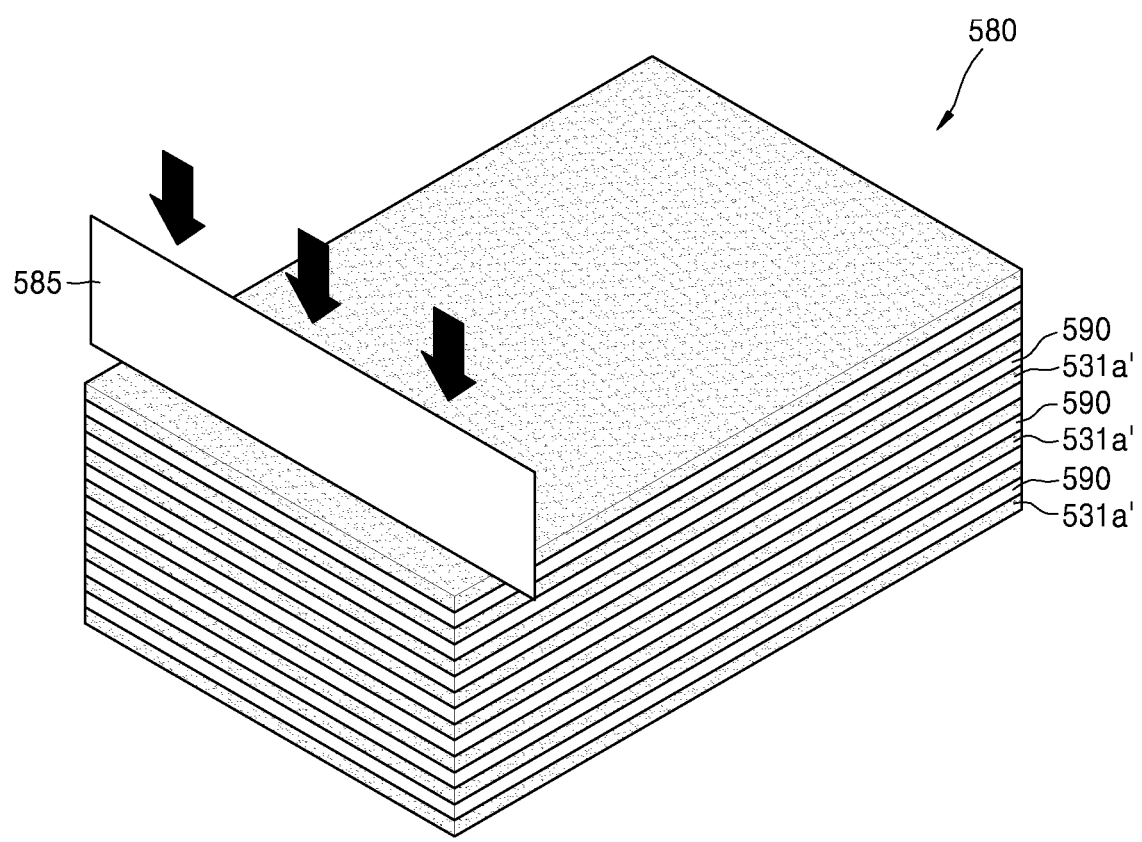
Figure 10:
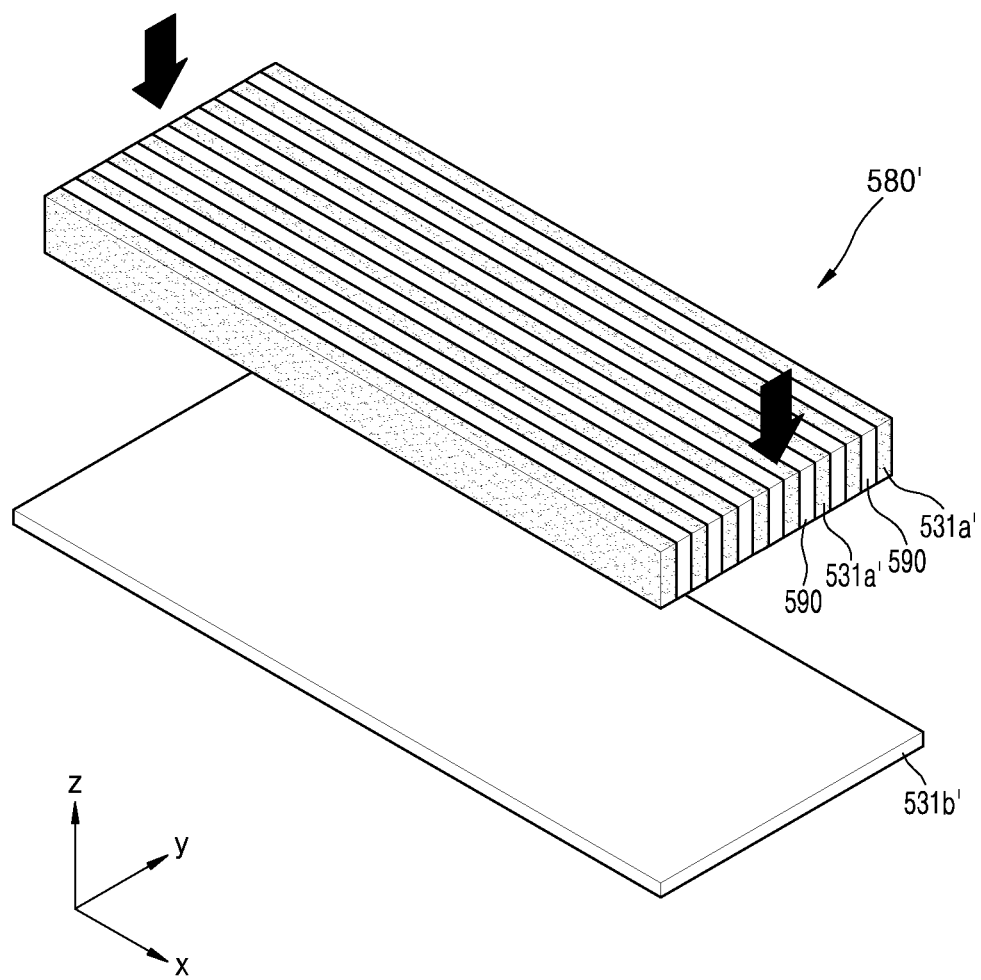

Referring to FIG. 9, the aforementioned film stacking complex 580 may be cut by using a cutter 585 such as a blade and be divided into a plurality of stacking complexes 580' having a desired size. Referring to FIG. 10, the stacking complex 580' may be attached to an upper surface of a bottom active material film 531b'. The bottom active material film 531b' may include an active material powder and a polymer binder like the perpendicular active material films 531a'. In an embodiment, the active material powder may be, for example, a positive active material powder.

Figure 11:
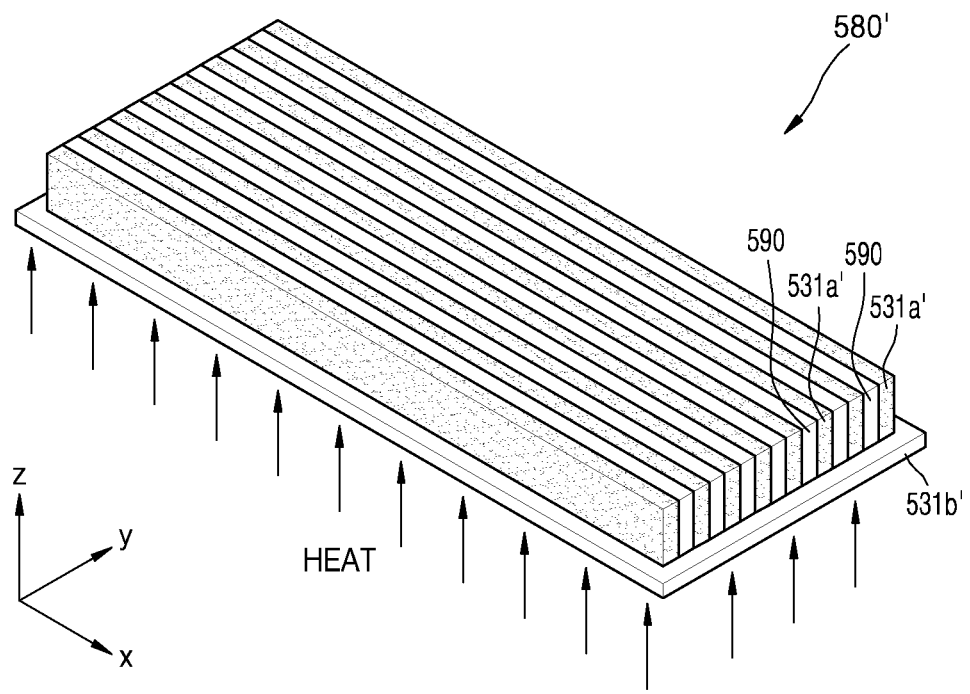

Referring to FIG. 11, a sintering process may be performed in a state in which the stacking complex 580' is attached to the bottom active material film 531b'. The sacrifice films 590 may be burnt out due to high temperature and be removed through the sintering process. In addition, in the sintering process, as the polymer binder is removed, the bottom active material film 531b' and the perpendicular active material films 531a' may be contracted to form a first active material layer 531 having a curved shape. The first active material layer 531 may include a bottom active material layer 531b and perpendicular active material layers 531a disposed in parallel to one another on the bottom active material layer 531b.

Figure 12:
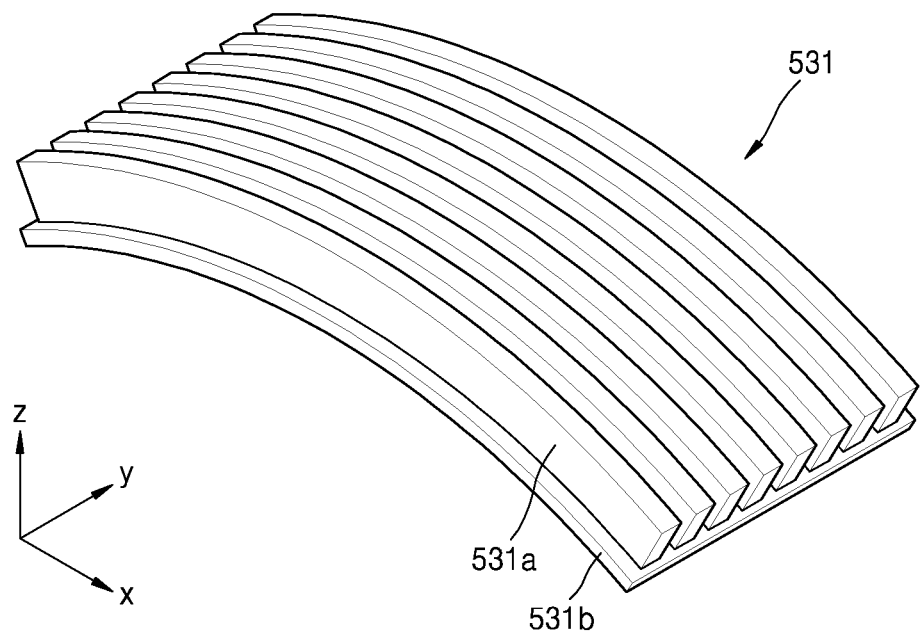
Figure 13:
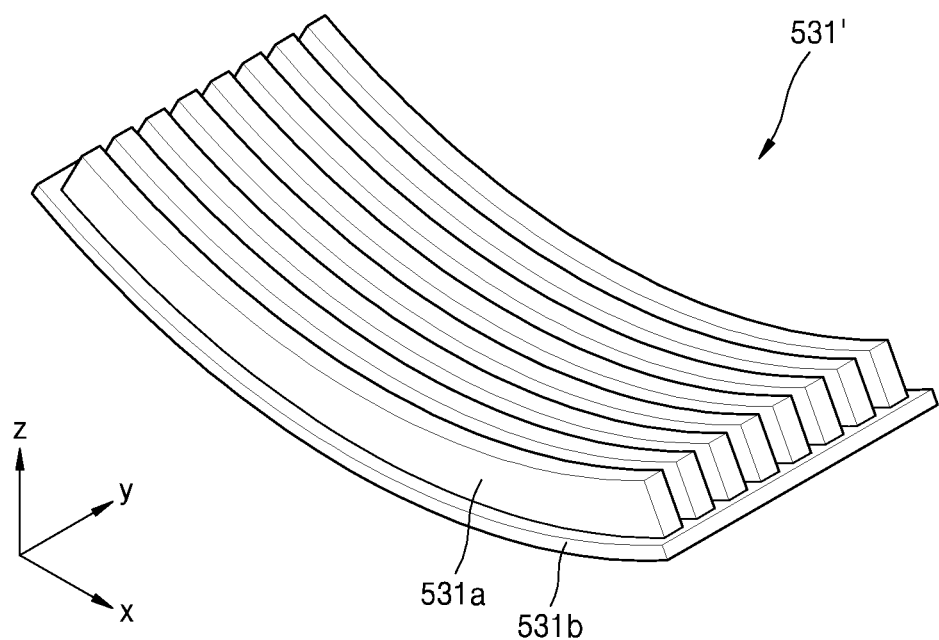

A direction, in which the first active material layer 531 is curved through the sintering process, may be determined by a line contraction percentage difference between the bottom active material film 531b' and the perpendicular active material films 531a'. For example, when a line contraction percentage of the bottom active material film 531b' is greater than a line contraction percentage of the perpendicular active material films 531a', the first active material layer 531 may be provided to be convexly curved in an upward direction, i.e., a +z-axis direction as illustrated in FIG. 12. In an alternative embodiment, when the line contraction percentage of the bottom active material film 531b' is less than the line contraction percentage of the perpendicular active material films 531a', a first active material layer 531' may be provided to be convexly curved in a downward direction, i.e., a −z-axis direction as illustrated in FIG. 13.

In an embodiment, the line contraction percentage of each of the bottom active material film 531b' and the perpendicular active material films 531a' may be adjusted, for example, by a content of the polymer binder and a grain size of the active material powder included in each of the bottom active material film 531b' and the perpendicular active material films 531a'. Generally, the more the content of the polymer binder or the greater the grain size of the active material powder, the greater a contraction percentage is.

When a volume content of the polymer binder included in the bottom active material film 531b' is greater than a volume content of the polymer binder included in the perpendicular active material films 531a', the bottom active material film 531b' may have a line contraction percentage greater than a line contraction percentage of the perpendicular active material films 531a'. Accordingly, the first active material layer 531 may be provided to be convexly curved in the +z-axis direction as illustrated in FIG. 12. In an alternative embodiment, when the volume content of the polymer binder included in the bottom active material film 531b' is less than the volume content of the polymer binder included in the perpendicular active material films 531a', the perpendicular active material films 531a' may have a line contraction percentage greater than a line contraction percentage of the bottom active material film 531b'. Accordingly, the first active material layer 531' may be provided to be convexly curved in the −z-axis direction as illustrated in FIG. 13.

Furthermore, when a grain size of the active material powder included in the bottom active material film 531b' is greater than a grain size of the active material powder included in the perpendicular active material films 531a', the bottom active material film 531b' may have the line contraction percentage greater than the line contraction percentage of the perpendicular active material films 531a'. Accordingly, the first active material layer 531 may be provided to be convexly curved in the +z-axis direction as illustrated in FIG. 12. In an alternative embodiment, when the grain size of the active material powder included in the bottom active material film 531b' is less than the grain size of the active material powder included in the perpendicular active material films 531a', the perpendicular active material films 531a' may have the line contraction percentage greater than the line contraction percentage of the bottom active material film 531b'. Accordingly, the first active material layer 531' may be provided to be convexly curved in the −z-axis direction as illustrated in FIG. 13.

Figure 14:
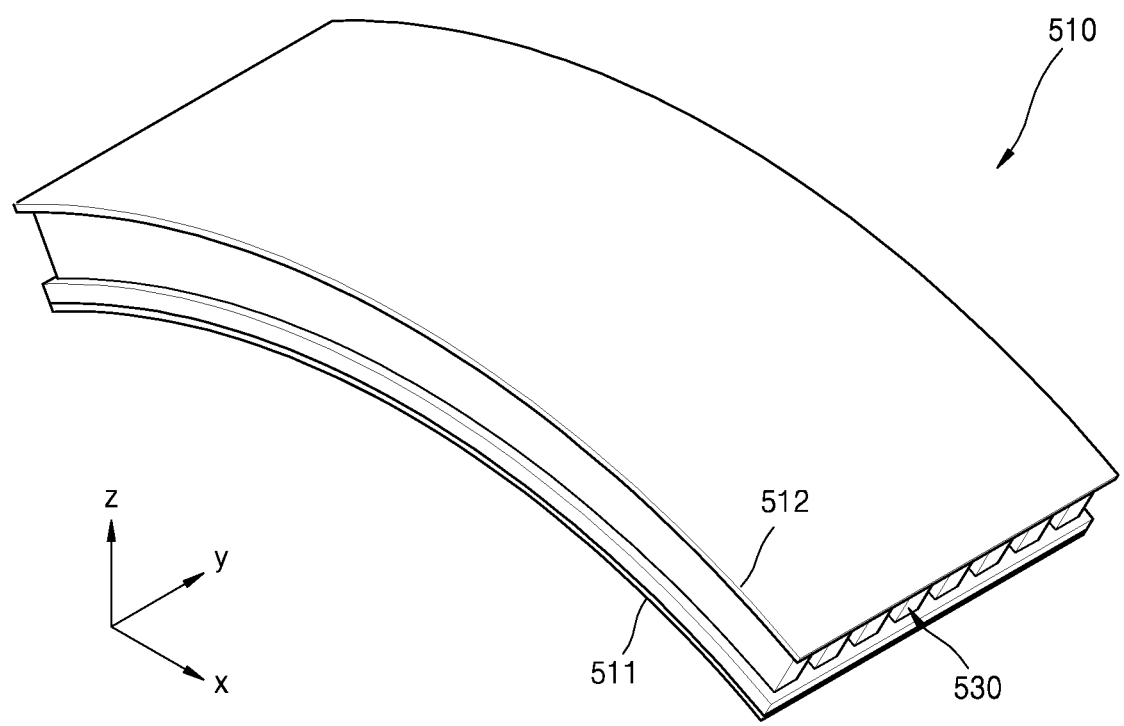

Referring to FIG. 14, as described above, a solid electrolyte film and a second active material layer are disposed on the first active material layer 531 to form a 3D electrode structure 530. The 3D electrode structure 530 may also have a curved shape corresponding to the first active material layer 531. FIG. 14 illustrates a case where the 3D electrode structure 530 has a shape convexly curved in the +z-axis direction. The unit cell 510 of the secondary battery may be manufactured by respectively attaching a first collector layer 511 and a second collector layer 512 to a lower surface and an upper surface of the curved 3D electrode structure 530. The first collector layer 511 and the second collector layer 512 may also be curved to have a curvature corresponding to a curvature of the 3D electrode structure 530.

FIGS. 15 to 19 are diagrams for describing a method of manufacturing a unit cell 610 in a secondary battery, according to another embodiment.

Figure 15:
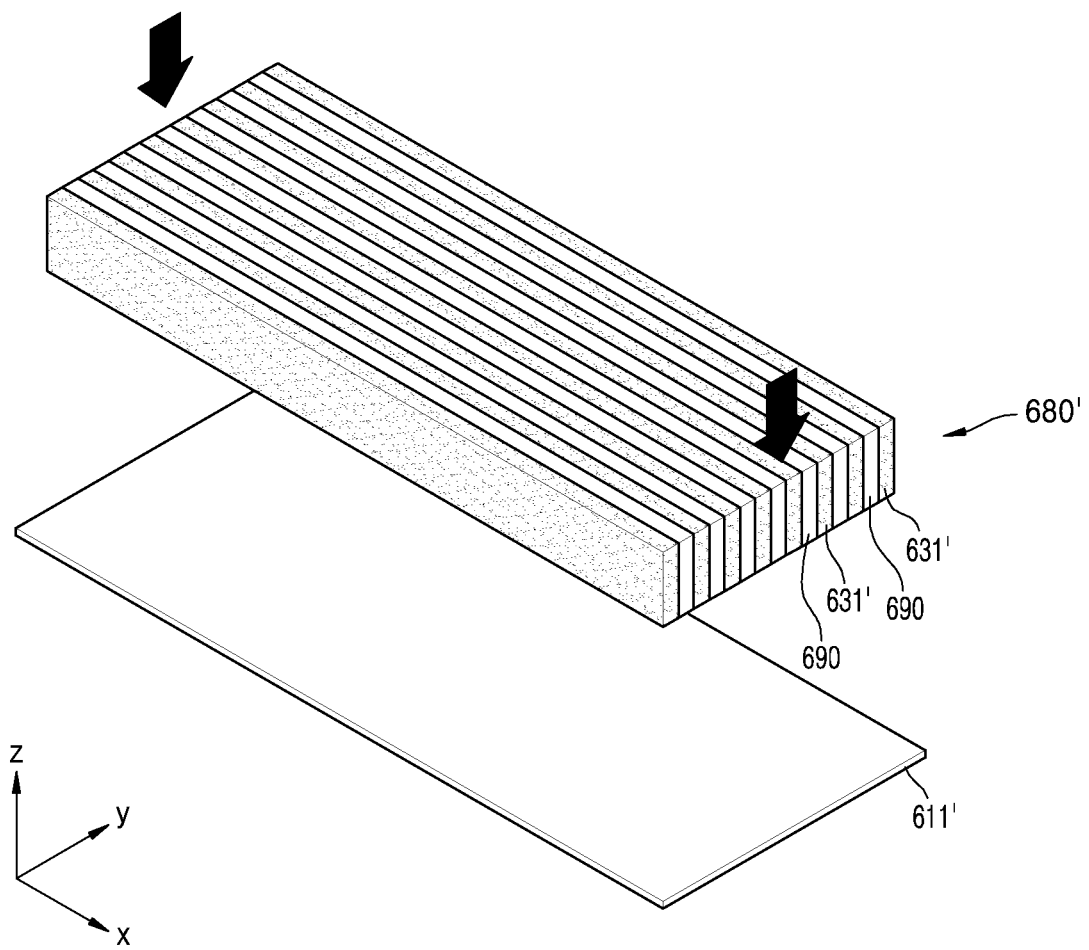
FIGS. 15 to 19 are diagrams for describing another embodiment of a method of manufacturing a unit cell in a secondary battery.

Referring to FIG. 15, a stacking complex 680' may be attached to an upper surface of a first collector film 611'. The stacking complex 680' may be substantially the same as the stacking complex 580' illustrated in FIG. 10 and have a structure in which a plurality of perpendicular active material films 631' and a plurality of sacrifice films 690 are alternately stacked. The perpendicular active material films 631' may include an active material powder and a polymer binder. In an embodiment, the active material powder may be, for example, a positive active material powder. The sacrifice films 690 may include a graphite powder and a polymer binder. The first collector film 611' may include a metal powder and a polymer binder.

Figure 16:
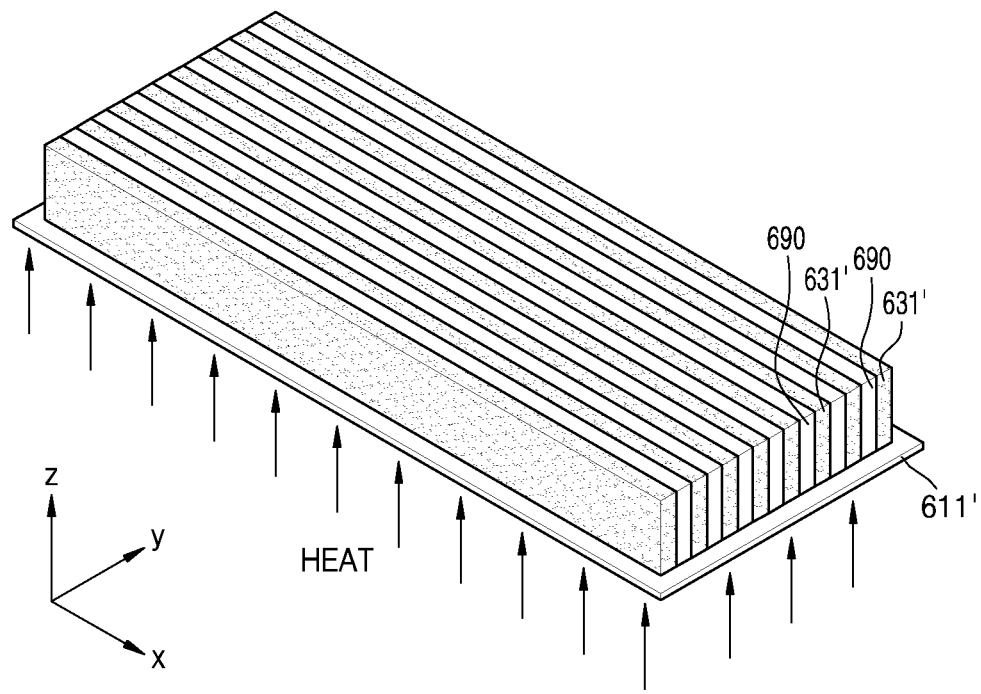

Referring to FIG. 16, a sintering process may be performed in a state in which the stacking complex 680' is attached to the first collector film 611'. The sacrifice films 690 may be burnt out due to high temperature and be removed through the sintering process. In addition, in the sintering process, as the polymer binder is removed from the inside of each of the perpendicular active material films 631' and the first collector film 611', the perpendicular active material films 631' and the first collector film 611' may be contracted to form a first active material layer 631 and a first collector layer 611, which have a curved shape. The first active material layer 631 may include a plurality of perpendicular active material layers disposed in parallel to one another on the first collector layer 611.

Figure 17:
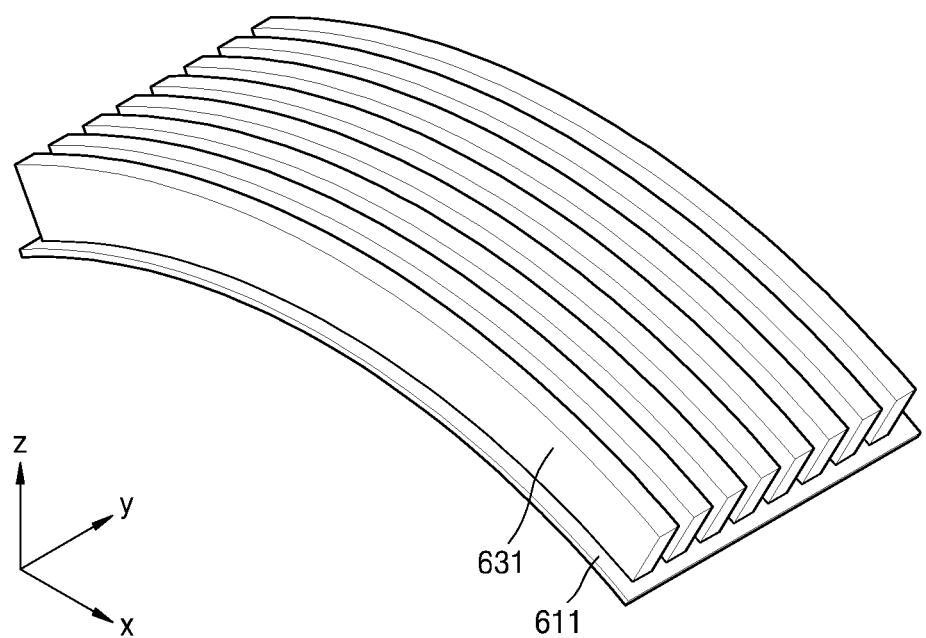
Figure 18:
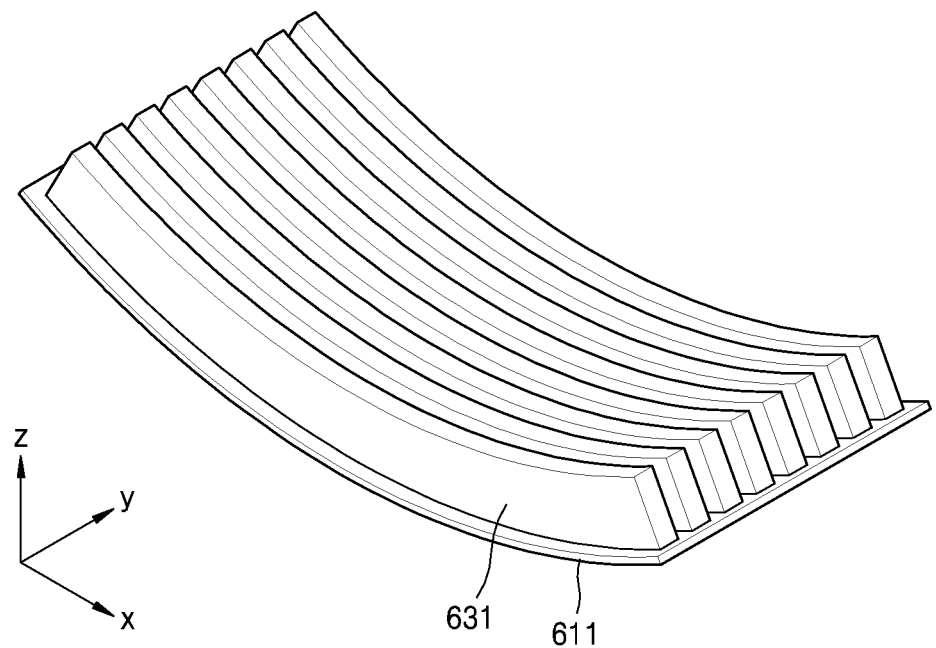

A direction, in which the first active material layer 631 and the first collector layer 611 are curved through the sintering process, may be determined by a line contraction percentage difference between the perpendicular active material films 631' and the first collector film 611'. In an embodiment, when a line contraction percentage of the first collector layer 611' is greater than a line contraction percentage of the perpendicular active material films 631', the first active material layer 631 and the first collector layer 611 may be provided to be convexly curved in an upward direction, i.e., a +z-axis direction as illustrated in FIG. 17, for example. In an alternative embodiment, when the line contraction percentage of the first collector film 611' is less than the line contraction percentage of the perpendicular active material films 631', the first active material layer 631 and the first collector layer 611 may be provided to be convexly curved in a downward direction, i.e., a −z-axis direction as illustrated in FIG. 18.

In an embodiment, the line contraction percentage of each of the first collector film 611' and the perpendicular active material films 631' may be adjusted, for example, by a content of the polymer binder and a grain size of the powder included in each of the first collector film 611' and the perpendicular active material films 631'. Generally, the more the content of the polymer binder or the greater the grain size of the powder, the greater a contraction percentage is.

Figure 19:
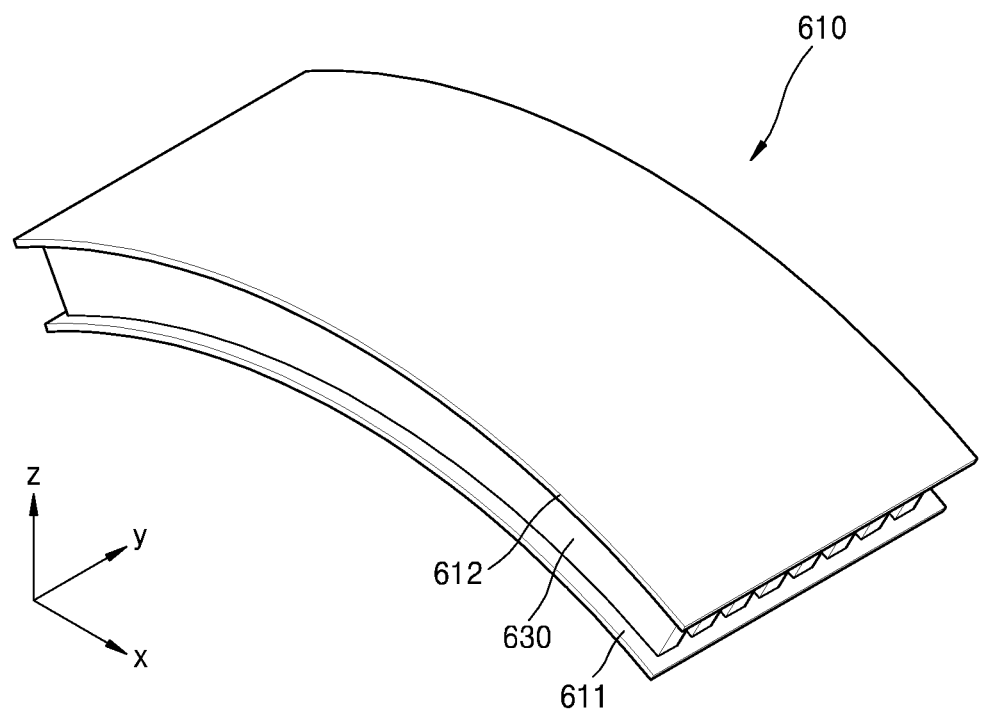

Referring to FIG. 19, as described above, a solid electrolyte film and a second active material layer are disposed on the first active material layer 631 to form a 3D electrode structure 630. The 3D electrode structure 630 may also have a curved shape corresponding to the first active material layer 631. FIG. 19 illustrates a case where the 3D electrode structure 630 has a shape convexly curved in the +z-axis direction. The unit cell 610 of the secondary battery may be manufactured by attaching a second collector layer 612 to an upper surface of the curved 3D electrode structure 630. The second collector layer 612 may also be curved to have a curvature corresponding to a curvature of the 3D electrode structure 630.

As described above, the unit cell of the secondary battery may have a curved shape with a curvature, and a plurality of curved unit cells may be stacked to realize a secondary battery having a high density and high capacity. Generally, a secondary battery including unit cells having a 2D structure may realize a high density and high capacity by bending the unit cells. However, such a secondary battery may have a lower capacity per a volume than that of a secondary battery having a 3D structure. In addition, an active material may be damaged when the secondary battery having the 3D structure is bent through a subsequent process so as to realize a high density and high capacity. Therefore, according to the illustrated embodiment, the unit cells may be manufactured in a previously curved shape, thereby realizing a secondary battery having a high density and high capacity. The secondary battery having the curved shape may be usefully applicable in a mobile device such as a smartphone or a wearable mobile device such as a smartwatch, which requires high capacity.

It should be understood that embodiments described herein should be considered in a descriptive sense only and not for purposes of limitation. Descriptions of features or embodiments within each embodiment should typically be considered as available for other similar features or embodiments in other embodiments.

While one or more embodiments have been described with reference to the drawing figures, it will be understood by those of ordinary skill in the art that various changes in form and details may be made therein without departing from the spirit and scope as defined by the following claims.

What is claimed is:

1. A secondary battery comprising:
a three-dimensional electrode structure having a thickness, a width and a length larger than the width, and curved in a thickness direction of the three-dimensional electrode structure to have a curvature;
a first collector layer disposed on a first surface of the three-dimensional electrode structure and having a curvature corresponding to the curvature of the three-dimensional electrode structure; and
a second collector layer disposed on a second surface of the three-dimensional electrode structure and having a curvature corresponding to the curvature of the three-dimensional electrode structure,
wherein the three-dimensional electrode structure comprises: a first active material layer; a solid electrolyte film disposed on the first active material layer; and a second active material layer disposed on the solid electrolyte film,
wherein the first active material layer comprises a plurality of perpendicular active material layers disposed perpendicularly on the first collector layer and extended in parallel to one another along a length direction of the three-dimensional electrode structure,
wherein the three-dimensional electrode structure has a shape in which a long side of the three-dimensional electrode structure extending along the length direction is curved in the thickness direction and a short side of three-dimensional electrode structure extending along a width direction is not curved in the thickness direction.

2. The secondary battery of claim 1, wherein the first active material layer further comprises:
a bottom active material layer disposed between the plurality of perpendicular active material layers and the first collector layer and curved to have the curvature.

3. A secondary battery comprising:
a plurality of unit cells stacked,
wherein each of the plurality of unit cells comprises:
a three-dimensional electrode structure having a thickness, a width and a length larger than the width, and curved in a thickness direction thereof to have a curvature;
a first collector layer disposed on a first surface of the three-dimensional electrode structure and having a curvature corresponding to the curvature of the three-dimensional electrode structure; and
a second collector layer disposed on a second surface of the three-dimensional electrode structure and having a curvature corresponding to the curvature of the three-dimensional electrode structure,
wherein the three-dimensional electrode structure comprises: a first active material layer disposed on the first collector layer; a solid electrolyte film disposed on the first active material layer; and a second active material layer disposed on the solid electrolyte film,
wherein the first active material layer comprises a plurality of perpendicular active material layers disposed perpendicularly on the first collector layer and extended in parallel to one another along a length direction of the three-dimensional electrode structure,
wherein the three-dimensional electrode structure has a shape in which a long side of the three-dimensional electrode structure extending along the length direction is curved in the thickness direction and a short side of three-dimensional electrode structure extending along a width direction is not curved in the thickness direction.

4. The secondary battery of claim 3, wherein the plurality of unit cells is stacked such that a first collector layer of a unit cell of the plurality of unit cells and a second collector layer of an adjacent unit cell of the plurality of unit cells face each other.

5. The secondary battery of claim 4, wherein an insulating layer is further disposed between the adjacent unit cells.

6. The secondary battery of claim 3, wherein the plurality of unit cells is stacked such that first collector layers of adjacent unit cells of plurality of unit cells face each other and second collector layers of the adjacent unit cells face each other.

7. The secondary battery of claim 3, wherein the first active material layer further comprises:

a bottom active material layer disposed between the plurality of perpendicular active material layers and the first collector layer and curved to have the curvature.

\* \* \* \* \*